United States Patent Office 3,133,863
Patented May 19, 1964

3,133,863
SUSTAINED RELEASE THERAPEUTIC TABLET COMPOSITIONS COMPRISING ORGANIC SOLVENT-GELLED GUMS
Robert Paul Tansey, Hudson, Ohio, assignor to Strong Cobb Arner Inc., Cleveland, Ohio, a corporation of New York
No Drawing. Filed Mar. 10, 1961, Ser. No. 94,705
4 Claims. (Cl. 167—82)

This invention relates to the formation of compositions of matter that are made using new and novel processing techniques and to the pharmaceutical compositions thereby resulting.

The basic concept involves the preparation of a homogenous two phase anhydrous medium containing a liquid, a hydrophilic and/or a hydrophobic sol, and with or without one or more therapeutic agents present. This system is then treated to form a uniform, dry granulation which has unique characteristics. In particular, a matrix is formed from a gel structure that can be converted into desirable pharmaceutical products with facility and having the quality of being consistently reproducible.

It is the object of this invention to provide pharmaceutical forms that are stable, uniform and lend themselves readily to subsequent standard of methods of processing. The procedure of manufacture entails the use of anhydrous ingredients which gel in the presence of particular organic solvent solutions having various polar ratings. Because of the behavioral qualities of the matrix system it is possible to produce solubilized, stabilized and/or timed release drug products.

In accordance with an embodiment of this invention, a granulation is made with or without one or more therapeutic agents present. This granulation is then sized and further processed into powder form or made in tablets and capsules. It is flowable, compressible and can be modified to extend the stability of the therapeutic components which by themselves may be hygroscopic, or may become potentially unstable in the presence of other chemical agents, or may be subject to auto-oxidation under existing methods of pharmaceutical processing techniques. The method of granulation ensures uniformity and reproducibility. The gelling agents are non-ionics and inert and are available in chemically pure form. The organic solvents, which are used to complete the granulation phase, effect a non-reactive liquid phase in the system at the temperature levels used and are easily dissipated from the granular composition leaving an essentially dry granulation for further processing.

In general, the usual method for producing granulations entails the use of aqueous media containing such substances as acacia, gelatin, sucrose, starch or glucose. These substances serve as binders in producting granulations for subsequent processing into various drug products. Caution must be exercised in the choice of which binder to use since definite requirements must be met to produce a granule that can lend itself readily to subsequent processing. If, in the case of producing compressed tablets, too much binder is used, the tablet will not easily disintegrate and it can cause excessive wear on punches and dies. If the wrong binder is used the granulation may not compress satisfactorily or at all. Then, too, the presence of water limits the extent to which this method can be used since some medicinal agents are sensitive to moisture especially at the elevated temperatures required for the drying cycle. In this instance a precompression or slugging method can be tried. If the tablet ingredients have innate binding and cohesive properties, then such method may be feasible. In summary, these techniques are empirical and difficult to manage except possibly to those long experienced in the art.

It should be further noted that on many occasions the wet granulation method using aqueous menstruums is used where known incompatibilities exist in the presence of moisture. In these formulations it is necessary to exercise special precautions which may entail vacuum drying and other complicated or relatively expensive procedures.

Because of the critical nature of both the dry and wet granulation methods, it is apparent that a more precise technique should be developed. As a consequence, a process was devised which has a more universal application in producing coated and granular pharmaceutical entities, which can be readily utilized in preparing various types of medicinal products. It has proved to be flexible and reproducible in its application.

The agents used as the basis of this invention are chemically pure, inert and non-toxic. More specifically, they are synthetically produced cellulose compounds which are chemically modified to form soluble colloids in a variety of solvents. They are capable of being hydrated and/or solvated. The basic concept of the invention is predicated upon the use of cellulose gums that form gels in anhydrous organic solvent systems. In particular, these gums are the methyl, ethyl and hydroxyethyl derivatives of cellulose. These long-chain cellulosic polymers in the presence of certain organic solvents have a tendency to swell and form long thread-like solvated molecules that are capable of suspending and adsorbing added components. This gel formation can be produced using standard processing techniques at ordinary room temperature levels. It can be geared to form uniform gel masses that can be dried at low heat and further processed into drug products. The viscosity of the gel is dependent on the type of cellulose gum and the amount and polarity of the organic solvent system used. The elements, which dictate the kind of cellulose compound and solvent phase to employ, are dependent on the characteristics of added components and the purpose for which the granulation is to be used. The solvent phase may be composed of one or more organic solvents such as methyl alcohol, ethyl alcohol, acetone, petroleum ether, chloroform, trichloroethylene, and methylene chloride.

Thus, in accordance with the foregoing it has been discovered that by incorporating one or more therapeutic agents in the cellulose gum and subsequently dispersing the anhydrous liquid phase throughout the dry powder mixture, a homogeneous system is formed in situ. With suitable stirring and gradual evaporation of the solvent phase the mass breaks up into smaller particles which are further treated using standard processing techniques. In effect, an integrated system is prepared which is uniform and stable, and because of its physical and chemical characteristics can be readily processed into desirable medicinal products.

Ordinarily, standard granulating equipment and drying chambers can be used to produce granulations. In some instances, spray drying or drum drying procedures may be more desirable for preparing coated granules.

The judicious selection of other agents can impart added facility to the matric system. Substances such as polyvinyl compounds (i.e., polyvinylpyrrolidone), phthalates (i.e., cellulose acetate phthalate), certain water-soluble resins and pyrogenic silica serve to modify the granular form to meet specified conditions. Other additives such as inert fillers commonly used in tablet forms, disintegrants, chelating agents, preservatives, surface active substances and antioxidants can also be used.

It has been found that chemical compounds which ordinarily exhibit instability either alone or in the presence of other compounds can be integrated in the prepared matrix and show prolonged stability in both instances. Therapeutic systems which previously could not be processed by wet granulation methods due to the deleterious effect of moisture and elevated temperature drying cycles can now be treated in anhydrous liquid systems to produce suitable granulations.

The proposed matrix system can be manipulated to produce immediate release drug forms or timed release forms. It can also be adapted to effect stabilization of chemical substances which are subject to auto-oxidation or other types of instability. Subsequent illustrations demonstrate these features.

A typical example of an application involving the principles of this invention can be exemplified in the preparation of acetylsalicylic acid tablets. It is generally recognized in the industry that acetylsalicylic acid is not stable in the presence of moisture. Therefore, the use of the wet granulation method, as previously described, cannot be used. The alternate method of slugging presents other difficult problems. By incorporating powdered acetylsalicylic acid with a portion of methyl cellulose and then dispersing the required amount of solvent composed of methylene chloride and methyl alcohol throughout the powder mixture, a granular form can be made, which is further processed to form dry granules. This granulation is compressible and can be made into a stable tablet product.

Another application refers to the preparation of acetyl p-aminophenol tablets. This compound resists compression. By integrating the active ingredient in a combination of methyl cellulose and polyvinylpyrrolidone a free flowing powder mixture is obtained. Subsequent treatment with methylene chloride and ethyl alcohol mixture produces a gel mass which readily breaks up, as the solvents evaporate, to form small granules. Further drying and screening produces a uniform, compressible granulation.

Other compounds possess cohesive qualities that make it difficult to produce tablets with reasonable disintegrating properties. Such a compound is exemplified by methyl, propyl propanediol dicarbamate. In this case, the matrix contains a cellulose gum capable of being solvated and another such gum which can be hydrated but not solvated. Therefore, by uniformly mixing the medicinal agent with portions of methyl cellulose, carboxymethyl cellulose and lactose, and granulating with methylene chloride and methyl alcohol, a free flowing compressible granulation can be formed. At this point an additional amount of carboxymethyl cellulose is mixed in the dried granulation along with magnesium stearate as a lubricant. Compressed tablets are made which disintegrate readily. The disintegration is caused by the hydration and subsequent swelling of the cellulose components.

In cases where an incompatibility exists between two chemical compounds the proposed matrix has a stabilizing effect. An example of this is shown in acetylsalicylic acid combination with antihistamines (i.e., pyranisamine maleate). These compounds, when processed using ordinary methods of granulation, usually darken on aging and become soft with ultimate degradation of the active agents. By forming an intimate combination of these therapeutic agents with methyl cellulose, with or without other inert fillers (i.e., lactose) present, a more stable tablet can be obtained. The matrix is formed in the usual way in the presence of an anhydrous organic solution. The moisture content of tablets prepared in this manner is nil.

An interesting application of this invention is the facility of being able to incorporate lubricating agents (i.e., magnesium stearate, stearic acid, talcum and cetyl alcohol) in with the active therapeutic agent(s) and cellulose gum during the granulation step. The lubricants can either be dissolved or dispersed in the solvent mixture that is used to granulate the powder mix. They can also be integrated in the dry powder phase prior to the addition of the solvent system. The recovered dry granules become self-lubricating and can be directly compressed into tablets.

Stable vitamin granules and tablets were prepared by extending the vitamins throughout the cellulose gum and subsequently granulating the mixture with an anhydrous organic solvent solution. Stabilizers such as antioxidants, chelating agents and buffering compounds may be added to the vitamin mixture or dissolved in the solvent prior to the granulating process. The recovered dry granulation can be sized and further treated to form a powder form or compressed into tablets. Stable forms of Vitamin A, ascorbic acid, Vitamin B–12, Calcium Pantothenate, d-Panthenol, Riboflavin and Folic Acid were respectively prepared in this manner. Also, combinations of these vitamins in tablet form were made and increased stability was observed.

This invention also relates to the formation of stable vitamin products in the previously described system by dissolving or dispersing one or more vitamins in the solvent mixture in the presence of stabilizers and recovering a dried powder by spray drying techniques.

Timed release granules and tablets were prepared by incorporating therapeutically active agents alone or in combinations in a matrix of a water-insoluble cellulose gum (ethyl cellulose) with the aid of the organic solvent solution. Discrete blends of water-soluble cellulose gums and/or other water-soluble additives are made with the ethyl cellulose to effect a predetermined release pattern of the therapeutic agent(s) in aqueous media. By the judicious selection of a proper blend of the water-soluble and water-insoluble cellulose gums, with or without other inert components, a straight-line release of the medicinally active component(s) can be achieved. The granules, which are ultimately obtained after suitable processing, are flowable and compressible.

The following examples further illustrate specific embodiments of this invention:

Example I

This example illustrates the preparation of tablets containing a solubilized therapeutic agent. Two batches of such tablets were made using acetylsalicylic acid and pheno-barbital, respectively.

(a) 300 parts of acetylsalicylic acid were dispersed in a uniform blend of a polyethylene glycol (100 parts), polyoxyethylene sorbitan ester (20 parts) and methyl cellulose (100 parts). The resulting mixture was formed into a granulation using a mixture of methylene chloride and methyl alcohol, the solvents were evaporated and the granulation was dried, following which the mixture was sized and compressed into tablets using suitable lubricants.

(b) 30 parts of phenobarbital were dissolved in a solvent system composed of methylene chloride and ethyl alcohol containing 10 parts of a polyethylene glycol, 30 parts of methyl cellulose and 40 parts of lactose. The gel which formed was dried and screened. Two parts of talcum and two parts of magnesium stearate were added and tablets made.

In both (a) and (b) entirely satisfactory tablets were formed and control tests proved the feasibility of producing pharmaceutical forms in this manner.

Example II

Tablets containing three active medicinal agents, which in combination display a physical incompatibility, were prepared according to the invention as follows:

| Ingredients: | Mg./tablet |
|---|---|
| Acetyl p-aminophenol | 150 |
| Amino phenyl propanol hydrochloride | 15 |
| Pyranisamine maleate | 20 |
| Methyl cellulose | 10 |
| Polyvinylpyrrolidone | 10 |
| Lactose | 45 |
| Stearic acid | 5 |
| Total | 255 |

A self-lubricating granulation was prepared by dissolving the stearic acid in a solution of trichloroethylene and methyl alcohol. This solution is then used to granulate a homogeneous blend of the remaining components. The gelled granulation can be screened either before or subsequent to the dying cycle. The dried granules can be compressed into tablets with or without an added disintegrant or additional lubrication.

Stability data obtained on samples stored at 45° C. for 5 months were very satisfactory.

*Example III*

The application of this invention to timed release medicaments is exemplified in the following formulation:

| Ingredients: | Mg./tablets |
|---|---|
| Phenobarbital | 60 |
| Ethyl cellulose | 25 |
| Methyl cellulose | 10 |
| Lactose | 30 |
| Magnesium stearate | 5 |
| Total | 130 |

The ethyl cellulose was dissolved in a solution of methylene chloride and ethyl alcohol. This gel solution is then used to granulate a uniform blend of the phenobarbital, methyl cellulose and lactose. After drying and screening the magnesium stearate was added.

The release rate of the phenobarbital from the tablet as tested in simulated body fluids is as follows:

| | Cumulative release, percent |
|---|---|
| After 1 hour in gastric fluid | 32 |
| After 2 hours in intestinal fluid | 47 |
| After 4 hours in intestinal fluid | 67 |
| After 6 hours in intestinal fluid | 80 |

*Example IV*

A stable composition of crystalline Vitamin B–12 was made by dissolving the vitamin in a solvent solution of methylene chloride and methyl alcohol. Sufficient vitamin was used to prepare a 1% dilution in a matrix consisting of 40 parts of methyl cellulose, 9 parts of a polyethylene glycol and 50 parts of mannitol. The method of preparation was similar to those described in the previous examples.

Stability data on powder samples stored at room temperature and 40° C. show no loss of B–12 activity after one year.

*Example V*

Stabilized dry forms of vitamin A acetate were prepared with and without antioxidants present, in which sufficient vitamin A ester was used to obtain a product having 500,000 units of vitamin A per gram.

Essentially, the vitamin was dissolved in trichloroethylene and ethyl alcohol combination containing the antioxidants and 2 parts of a polyoxyethylene sorbitan ester. A control was also made having no antioxidants. This vitamin solution is then dispersed throughout a powder mixture consisting of 20 parts of methyl cellulose, 50 parts of mannitol and 10 parts of pyrogenic silica. The gel mass is dried in vacuo at 30° C. and finally re-reduced to powder form.

Stability data on samples stored at room temperature was as follows:

| Sample | Antioxidants | Assay in Units of Vitamin A Per Gram | | |
|---|---|---|---|---|
| | | Initial | 1 Month | 8 Months |
| 1 | None | 534,000 | 393,000 | 23,000 |
| 2 | Present | 528,000 | 520,000 | 491,000 |

Antioxidants used: Butylated hydroxy anisole and butylated hydroxy toluene.

It is to be understood that the foregoing is intended as illustrative and not limitative and that modifications in the procedure as herein described above may be made without adversely affecting the results attained and without departing from the scope or principles thereof.

What is claimed is:

1. A composition of matter comprising a therapeutic agent dispersed in a cellulose gum selected from the group consisting of methylcellulose, ethylcellulose, hydroxyethylcellulose and carboxymethylcellulose gelled in an anhydrous volatile organic solvent prior to evaporation of such solvent and forming a homogeneous matrix in situ, and the matrix being self-granulating as the solvent evaporates.

2. A therapeutic composition of matter comprising a therapeutic agent dispersed in a cellulose gum selected from the group consisting of methylcellulose, ethylcellulose, hydroxyethylcellulose and carboxymethylcellulose gelled in an anhydrous volatile organic solvent prior to evaporation of such solvent and forming a homogeneous matrix in situ, said composition being selectively adaptable both to immediate and to delayed release of the therapeutic agent therefrom and the matrix being self-granulating, as the solvent evaporates, into small granules which, when further dried and screened, have the form of a uniform, compressible granulation which can be shaped into readily disintegratable tablets in which disintegration results from hydration and swelling of the cellulose gum.

3. A therapeutic composition of matter comprising a therapeutic agent dispersed in a mixture of cellulose gums selected from the group consisting of methylcellulose, ethylcellulose, hydroxyethylcellulose and carboxymethylcellulose and mixtures thereof gelled in an anhydrous volatile organic solvent prior to evaporation of such solvent and forming a homogeneous matrix in situ, said composition being selectively adaptable both to immediate and to delayed release of the therapeutic agent therefrom and the matrix being self-granulating as the solvent evaporates into small granules which, when further dried and screened, have the form of a uniform, compressible granulation which can be shaped into readily disintegratable tablets, one of said cellulose gums being capable of being solvated and another of said cellulose gums being capable of being hydrated but not solvated.

4. A composition of matter comprising a therapeutic agent and a lubricating agent dispersed in a cellulose gum selected from the group consisting of methylcellulose, ethylcellulose, hydroxyethylcellulose and carboxymethylcellulose gelled in an anhydrous volatile organic solvent prior to evaporation of such solvent and forming a homogeneous matrix in situ, said composition being selectively adaptable both to immediate and delayed release of the therapeutic agent and the matrix being self-granulating as the solvent evaporates to provide granules which are self-lubricating during subsequent compression into tablets.

References Cited in the file of this patent

UNITED STATES PATENTS

| | | |
|---|---|---|
| 2,218,591 | Taylor | Oct. 22, 1940 |
| 2,529,461 | Schneiderwirth | Nov. 7, 1950 |
| 2,921,883 | Reese et al. | Jan. 19, 1960 |
| 2,951,792 | Swintosky | Sept. 6, 1960 |
| 2,987,445 | Levesque | June 6, 1961 |
| 2,991,226 | Millar et al. | July 4, 1961 |

OTHER REFERENCES

Christenson et al.: 3,065,143 Nov. 22, 1962 (filed Apr. 19, 1960 as a C/P of Ser. No. 667,620 filed June 24, 1957 and of Ser. No. 690,418 filed Oct. 16, 1957, both now abandoned).